United States Patent [19]

Willard

[11] 4,167,588

[45] Sep. 11, 1979

[54] PREPARATION OF FABRICATED BAKED POTATO PRODUCT

[76] Inventor: Miles J. Willard, 229 N. Lloyd Cir., Idaho Falls, Id. 83401

[21] Appl. No.: 729,480

[22] Filed: Oct. 4, 1976

Related U.S. Application Data

[63] Continuation-in-part of Ser. No. 459,467, Apr. 10, 1974, abandoned.

[51] Int. Cl.² ............................................. A23L 1/216
[52] U.S. Cl. ..................................... 426/283; 426/89; 426/103; 426/637; 426/388; 426/438; 426/284
[58] Field of Search ............... 426/637, 283, 289, 296, 426/438, 439, 482, 549, 653, 89, 103, 284, 388

[56] References Cited

U.S. PATENT DOCUMENTS

| | | | |
|---|---|---|---|
| 2,863,770 | 12/1958 | Spieser | 426/347 |
| 3,057,732 | 10/1962 | Conard et al. | 426/283 |
| 3,537,386 | 11/1970 | Grosbard | 99/353 |
| 3,764,344 | 10/1973 | Glabe | 426/637 |

*Primary Examiner*—Joseph M. Golian
*Attorney, Agent, or Firm*—Christie, Parker & Hale

[57] ABSTRACT

A fabricated baked potato product comprises a core of potato mash enclosed by a fabricated outer skin containing baked potato solids. The outer skin is preferably made by baking peeled potato pieces to impart a baked potato flavor, grinding the baked pieces, and mixing the ground baked potato pieces optionally with water, starch, and cooked potato solids to form a pliable, cohesive baked potato dough. In a presently preferred method, the baked potato pieces are dried to a moisture content of less than about 10% and then comminuted to form a dry baked potato powder which is mixed with the optional ingredients to form the baked potato dough. An intermediate product is produced by forming the dough as a thin layer around a core of potato mash. The potato mash core is completely encased in the outer dough, preferably by simultaneous extrusion techniques. The intermediate product is eventually fried in hot cooking oil to form a novel potato product which retains the flavor of fresh baked potatoes.

16 Claims, 4 Drawing Figures

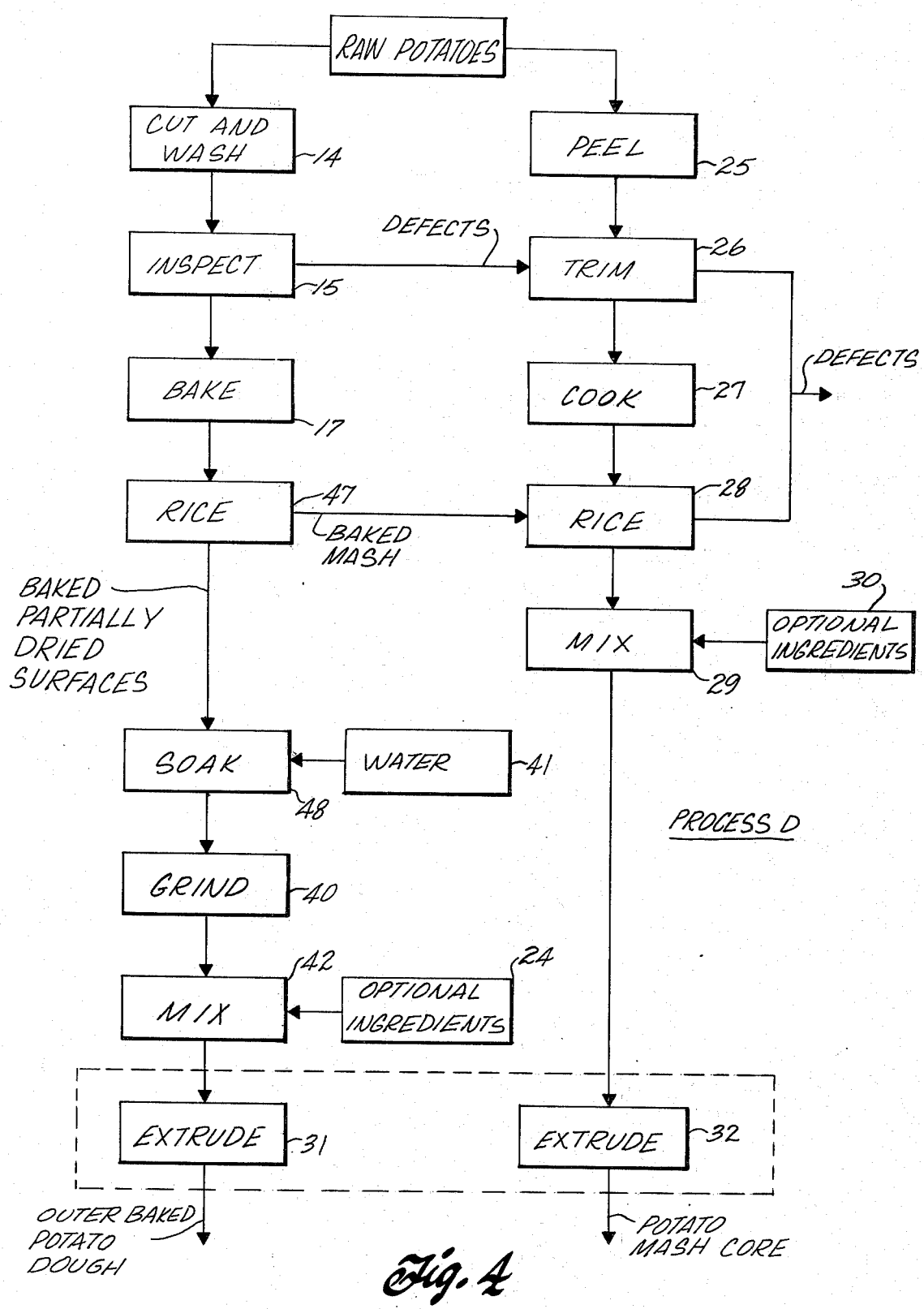

PREPARATION OF FABRICATED BAKED POTATO PRODUCT

CROSS-REFERENCE TO RELATED APPLICATION

This application is a continuation-in-part of my application Ser. No. 459,467, filed Apr. 10, 1974 now abandoned.

FIELD OF THE INVENTION

This invention relates to the preparation of convenience foods, and more particularly to a fabricated baked potato product and to an improved process for making the product.

BACKGROUND

The traditional method of preparing baked potatoes from fresh raw potatoes is inconvenient and time consuming. Baked potatoes are generally prepared by initially scrubbing the potato skins, removing visible defects in the potatoes by hand, and then baking the potatoes in their skins at 350° F. for approximately one hour until the potatoes are uniformly baked.

A well known form of baked potatoes is described in many cookbooks as the "twice baked" or stuffed potato. This product is normally prepared in the home by scooping the inner portion from a previously baked potato, mashing it, combining it with milk and butter and other seasonings, and returning it to the original potato shells. The filled potato shells are then baked an additional short period in an oven to reheat the potatoes and brown their tops. The flavor of the original baked potato is retained, but this process is laborious and time consuming.

The most nutritious and flavorful part of the baked potato is the skin and the portion of the potato flesh immediately inside the skin. However, this valuable portion of the potato is frequently left uneaten by the consumer. Despite the apparent advantages gained from using the entire potato, the convenience food industry has not yet produced a commercially successful fabricated potato product having the flavor of fresh baked potatoes which can be prepared for eating in much shorter time than traditional baked potatoes or twice-baked potatoes.

U.S. Pat. No. 3,689,282 to Feinberg discloses a method of cooking raw unpeeled potatoes in a salt solution, followed by storage at refrigerator temperatures, and final heating by radiant energy for preparation. Samples of baked potatoes prepared by this process lack the typical baked potato flavor.

U.S. Pat. No. 3,057,732 to Conrad et al discloses a low-cost frozen mashed potato product in a synthesized edible shell which may be readily prepared for eating. The shell is made from a wheat flour batter poured into preformed shells which are later filled with mashed potatoes. The patent also discloses adding comminuted cooked whole potatoes to the pastry shell to give it a potato flavor. Samples of potatoes prepared by this process lack a typical baked potato flavor; and when the products are reheated in the oven for preparation, a loss of moisture from the mashed potato portion creates an untypical hard skin on the surface.

SUMMARY OF THE INVENTION

This invention provides a novel fabricated potato product having a flavor resembling that of fresh baked potatoes. The product requires only a few minutes time to prepare it for eating, and therefore overcomes the disadvantages of the products described above.

The product according to this invention includes a core of potato mash completely encased in a fabricated skin which contains ground baked potato pieces. The ground baked potato pieces are mixed with cooked potato solids to form a cohesive substantially potato-based dough having a solids content greater than that of the potato mash core. The dough is preferably extruded as a thin layer around the core, and eventually fried in hot cooking oil. The higher solids content of the outer dough facilitates commercial handling and shaping of the product before frying.

This invention also provides processing techniques for making the fabricated baked potato product. According to a presently preferred form of the process, "peeled potato pieces", i.e., potatoes having at least a portion of the inside tissue exposed, are baked to impart to the pieces a baked potato flavor. The baked pieces are then comminuted and mixed with certain optional ingredients, such as water, cooked potato solids and starch, to form a pliable baked potato dough composed substantially of potato solids and water.

Preferably, the potato pieces are baked and dried to a moisture content of less than about 10%, followed by comminuting the baked pieces to form a dry baked potato powder which is later mixed with water and the optional ingredients to form the baked potato dough.

The baked potato dough is formed as a thin layer or skin around a core of cooked potato mash to enclose the core and provide an intermediate product which, upon frying, produces a simulated baked potato product.

These processing steps, together with other processing techniques, provide significant improvements which will be more fully understood by referring to the following detailed description and the accompanying drawings.

DRAWINGS

FIG. 4 is a flow diagram of a further alternate improved Process D.

DETAILED DESCRIPTION

Original Process A

Figure 1:
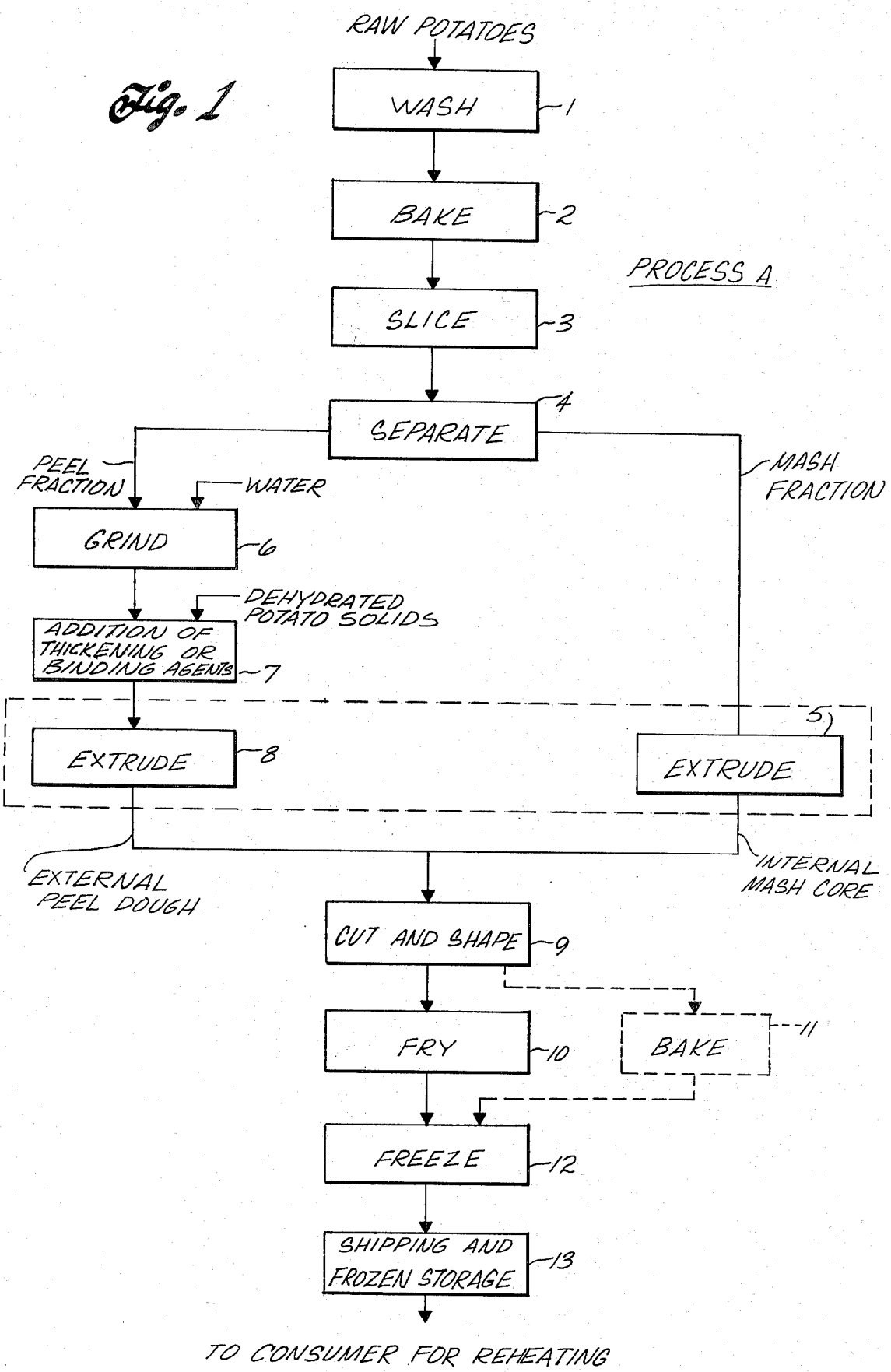
FIG. 1 is a flow diagram of my original Process A for preparing a fabricated baked potato product.

FIG. 1 illustrates my original process for making a fabricated baked potato product. Raw, whole, unpeeled potatoes of any variety and any shape are washed in water by a washing step 1 to clean the skins of the potatoes. The potatoes are inspected to remove defects.

The potatoes are then heated by a standard baking step 2, preferably by baking in a continuous oven maintained at about 375° F. for about one hour. The term "baking" herein is intended to mean a process of cooking raw potatoes in dry heat at a sufficiently high temperature and for a long enough period of time to produce the characteristic baked potato flavor. The baked potato flavor desired by this invention is well-defined, inasmuch as the chemical components generally responsible for the traditional baked potato flavor have been identified. The flavor components are primarily pyrazines which are formed by heating a potato in dry heat under conditions which completely dehydrate the outer portion of the potato. Pyrazines are formed in areas of the potato which are raised to temperatures above about 100° C. Below that temperature, there is essentially no pyrazine formation. For a more complete description of the flavor components of baked potatoes, see Buttery et al, "Volatile Components of Baked Potatoes", *J. Sci. Fd. Agr.* 1973, 24, pp. 1125–1131; and Pareles et al, "Identification of Compounds Responsible for Baked Potato Flavor", *J. Agr. Food Chem.*, Vol. 22, No. 2, 1974, p. 339.

The characteristic baked potato flavor is obtained according to Process A by baking whole raw unpeeled potatoes in an oven between about 350° F. to about 400° F. for between about 50 to 70 minutes. The potatoes also can be baked by microwave energy for a shorter period of time and finished by heating them in an oven or dryer under conditions which produce the desired flavor components. According to Processes B and C described below, the baked potato flavor also can be obtained by heating sliced or cut peeled or unpeeled, or peeled whole potatoes in a through-circulation dryer.

Next, the baked potatoes are cut into pieces by a slicing step 3. The potatoes are either passed through a commercial slicer, or are cut by hand into segments about 1-inch wide to expose the cooked inner portions or core of the potatoes. The sections are then inspected, and any potatoes showing defects are discarded.

The baked potato skins are separated from the cooked inner portions of the potatoes by a separation step 4. Preferably, the potatoes are passed through a commercial ricing apparatus, such as the type described, for example, in U.S. Pat. No. 3,024,823 to Hyde et al. Generally speaking, the potato sections are separated in the ricing apparatus by forcing them through a perforated screen so that the cooked inner portions can be recovered as one fraction, and the toughened baked potato peeling can be recovered as a second fraction. The mash fraction and the peel fraction are then processed separately before being recombined into a finished product.

The mash fraction is prepared according to the following procedure. The cooked inner portions of the potatoes are riced while still hot to remove residual lumps of potato peel so as to produce a potato mash of uniform texture. If desired, the potato mash can be mixed with milk, butter and other flavors or ingredients to impart a desired flavor and texture to the finished product.

While the mash is still hot, it is formed by suitable means, such as by an extrusion step 5 in a positive food displacement extruder, or by a positive displacement food pump, through openings of a desired shape. Preferably, a cylindrical opening of about one-inch in diameter is used to extrude extended cylindrical sections of potato mash.

As the mash fraction is being extruded, it is simultaneously encased with an outer layer prepared from a peel fraction according to the following procedure. The baked potato peel, along with any adhering potato mash, is ground to a finely divided pulp by a comminuting step 6. Several alternate methods of comminuting the potato peel fraction can be used. For example, a quantity of baked potato peel is combined with an amount of water equal to about two times the weight of the peel, and the peel and water are ground in a blender. This forms a relatively thin slurry of water and potato skin pulp.

The slurry is subjected to a mixing step 7 in which a suitable thickening or binding agent is mixed with the slurry to form a dough. This facilitates handling of the potato peel mixture when subsequently used to coat the extruded potato mash. It is desirable to blend the potato skin slurry with at least some amount of potato solids, such as dehydrated mashed potatoes. This increases the solids content of the potato skin slurry and acts as an extender for the ground potato skins which facilitates handling and shaping of the potato skin dough. It also also provides better coverage of the extruded potato mash section before the product is heated, and it provides a more desirable texture of the finished fabricated skin. The fabricated skins still contain sufficient baked potato peel to be flavorful, i.e., to resemble the flavor of the skin of a fresh baked potato. The addition of the extra potato solids makes the skin easier to consume so that all the valuable nutrients of the peel fraction are made easily available to the consumer.

The added potato solids thicken the peel slurry so that the peel dough fraction can be easily formed in a commercial extruder, such as those used for making fig newtons, or any other type of extrusion process in which the peel fraction is shaped by forcing it through a die under high pressure. The dehydrated mashed potato solids added to the potato skin slurry can be in granule, flake or other suitable form. By grinding potato flakes more finely, sufficient gelatinized starch is released to substantially increase the viscosity of the potato skin slurry. Other food thickening agents such as pectins, alginates, pregelatinized starches or gums can be used for the same purpose. The quantity and nature of the thickening or binding agent ingredient is dependent on the manner of final processing of the combined peel and mash fractions and the texture of the fabricated skin of the finished product desired. These alternate means of processing are well known to those skilled in the art and this invention is not limited to any one choice.

A final optional group of ingredients that may be added to the peel slurry are raw starches and other thermal gelling binding agents such as egg solids, Methocel (hydroxy-propyl methylcellulose), etc. During the heating of the fabricated skin, these produce a firm texture which greatly facilitates subsequent handling. In one method of increasing the solids content of the diluted potato pulp slurry, a quantity of raw potato starch equal to the added dehydrated potatoes is used. However, this step is not critical, since equivalent finished products have been made when dehydrated potatoes alone are added to the potato skin slurry without any raw starch. Dehydrated cooked potato solids remain the preferred thickening agent because they taste like potatoes, and the purpose is to make a finished product with the flavor of a traditional baked potato.

The potato peel fraction can also be made by a process in which more of the inner portions of the previously baked potatoes can be left with the skins when the two fractions are separated during the ricing step. Thus, when the peels are ground, the released starch from the ground potato mash serves as its own binder, requiring less added solids for thickening. Furthermore, a portion of the original cooked mashed potato fraction can be added to the ground potato skins in place of a portion of the dehydrated mashed potatoes.

An alternate method of making the potato peel fraction is to dry the separated baked potato peels to a moisture content of below about 10%. The dry peels are then added to a hammermill which can comminute the potato skins more easily than if the baked potato skins are macerated in water. The dehydrated ground potato skins are thereafter reconstituted by soaking them in hot water to replace the quantity of water which was lost so that the resulting potato fraction will approximate that found in ordinary baked potatoes. The ground material, when rehydrated, then can be combined with the dehydrated mashed potatoes, potato starch, or other suitable binders as described above.

In a further alternate method of making the potato peel fraction, the separated baked potato peels are ground without the addition of water. A standard meat grinder with 1/32-inch holes has been satisfactory for this purpose. Alternately, a hammermill operating at high speed may be used to reduce the cooked potato skins to a fine pulp. As a result of this type of grinding step, the ground potato skins are very sticky, due to the rupture of the potato cells in the grinding process. Although the ground skin pulp may be used in this condition to coat the extruded mash, it has been found more desirable to blend the ground potato skins with water and a suitable binding or thickening agent such as dehydrated potato solids, potato starch, or the like, as discussed above.

In an extruding step 8, the mixture of ground potato skin pulp, together with any water, seasonings, additional potato solids, and binding agents, if added, are formed around the potato mash. The mixture is forced by standard means through an extruder having an annular shaped extrusion nozzle located around the outside of the simultaneously extruded potato mash. The thickness and texture of the extruded potato skin of the final product can be controlled by regulating the ratio of the ground skin pulp solids to the potato solids mixed with the peel fraction. The solids content of the peel dough is substantially greater than that of the potato mash core, which facilitates commercial extrusion of the potato peel dough around the inner core of potato mash. With a high ratio of skin pulp solids and a relatively high water level in the peel dough, the final fabricated skin will be thin, approximating the thickness of a fresh potato skin. As more potato solids are combined with the ground peel fraction, the thickness of the fabricated skin can be extended to any desired level, say from ⅛ to ¼ of an inch.

The composite product from the extruder is a continuous cylinder of baked potato peel dough enclosing the potato mash core which is formed into desired shaped and cut by a forming step 9. Preferably, the continuous extruded cylinder is pinched down to completely seal the potato mash core in an outer layer of the higher solids peel dough. The sealed pieces are cut and separated into individual sections.

The formed pieces are then conveyed to a heat treatment unit to firm the outer potato peel layer. A preferred method of heating comprises a frying step 10 in which the extruded potato products are fried in hot cooking oil at 375° F. between about 30 to about 60 seconds. The oil absorbed during the drying step provides a good texture. Alternately, heating the formed products by a baking step 11 at 490° F. for about 2 to about 5 minutes also produces a good finished product.

Following heat treatment, the fabricated baked potatoes are cooled and then subjected to a freezing step 12 in a standard freezer to produce a finished product which is shipped to the consumer under frozen storage 13 for ultimate use as a convenience food. Alternately, the finished product can be cooled after frying or baking and distributed under refrigeration in the manner of pre-peeled potato products. It can be frozen directly after extrusion and later fried to form the finished product for immediate consumption.

Experimental Data

Data from various experiments in making baked potato products in accordance with this invention have been compiled, yielding the following results.

1. A standard Idaho potato used to produce the preformed baked potato of this invention weighs approximately 83.5% of its initial raw weight after being baked.

2. As fresh potatoes are baked, the moisture content of the peel fraction separated from the inner mash, as described above, decreases because of the loss of water. In experiments conducted to provide the desired peel fraction, the moisture content of the peel fraction ranged from 49% to 64%, with an average of 57%. After the peel fraction is ground with water, it will have a moisture content of about 80% to 88%, depending upon the quantity of water added and the quantity of potato solids adhering to the dry peel.

3. After adding the potato solids described above, the resulting potato peel dough mixture will have a moisture content of approximately the same as the baked potato peel fraction, i.e., between 49% and 64%. With the peel dough moisture content of about 50% to 60%, the dough is most easily formed around the inner cooked potato mash core and sealed so that the resulting product will hold together while baked or fried in the subsequent treatment steps.

EXAMPLES

Example No. 1

A quantity of medium sized Idaho Russet potatoes weighing 2069 grams was baked at 375° F. for about 60 minutes until done. The weight of the baked potatoes was 1328 grams. The potatoes were cut in half and the inner portions scooped out, leaving a peel fraction of 230 grams. The mash was riced and mixed with milk and butter and shaped. The weight of the cooked mash, after adding the milk, butter and salt, was 1477 grams. The mash was shaped into small cylinders approximately one inch in diameter and one inch long, weighing on the average of 11 grams each. The peels were combined in a blender with 460 ml of water and ground into a uniform slurry. The moisture content of the ground peels was 87.9%. The final ground potato peel mixture contained 552.5 grams of ground peels and water, 184 grams of potato starch, 184 grams of potato flakes ground to pass a 20 mesh sieve, and 14 grams of salt. After adding these ingredients to the ground peel, the moisture content was 56.3%. This mixture resembled stiff mashed potatoes and was formed into a round sleeve 1.25 inches in diameter using a laboratory piston extruder with an annular opening 1/16 inch wide.

As the ground peel mixture was extruded through this annular opening, the extruded mash was held so that the extruded peel fraction enveloped it. Each end of the fabricated product was then pressed together to form a pillow-shaped product. These products were fried in vegetable shortening held at 375° F. for a period of either 30, 45, or 60 seconds. Another group of the same products were baked for a period of 4 minutes at 490° F. The products were then cooled and frozen. Later, samples of each were reheated by baking in an oven at 400° F. for a period of eight minutes. The products were heated thoroughly, and each had an acceptable potato skin texture. The texture of the sample fried for 60 seconds was preferred because it was crisper. The products could either be eaten in hand or cut on the plate as normally done with baked potatoes. The products were weighed after combining the peel and mash, and it was found that the average weight was about 19 grams, and that the peel fraction was 39% of the weight of the product before frying. In subsequent experiments, larger individual products were prepared from the same ingredients having an average weight after frying of 40 grams and 60 grams. With these products, the skin fraction was 30% and 25.6%, respectively, of the total weight before frying. The same experiment was repeated in which the potato starch was replaced with corn starch, then with an equal amount of potato flakes ground to pass a U.S. 20 mesh sieve, and finally with potato granules, all of which gave an excellent finished product.

EXAMPLE NO. 2

Several fresh Russet potatoes from the same lot and about the same size as the products from Example No. 1 were baked for one hour at 350° F. They were cooled and frozen. The frozen potatoes were placed in an oven at 350° F. along with the frozen product made in Example No. 1, and both were judged to be done after 30 minutes. The outer skins of the reheated frozen fresh potatoes were tough and difficult to chew, whereas the fabricated skins of the products of Example No. 1 were tender, could be easily chewed and eaten in their entirety, and had a desirable flavor. A distinct 'warmed over' flavor was noted in the fresh baked potato after reheating, whereas no such off-flavor was noted in the reheated product from Example No. 1.

EXAMPLE NO. 3

Baked potato peels were dried to a moisture content of below 10% and then ground in a hammermill. 23 grams of the dried peel were combined with 127 grams of boiling water, and allowed to stand for one hour. After cooling, they were combined with 50 grams of potato flakes, normal retail grind, capable of passing through a ¼ inch sieve, plus 50 grams of potato starch and 4 grams of salt. This mixture could easily be handled, and was extruded through an annular opening around an inner section of potato mash recovered from baked potatoes and later mixed with milk, salt, and butter. This product was formed in the shape of a raviola weighing approximately 20 grams. The product was fried for 60 seconds at 375° F. to form the outer portion, after which it was cooled and frozen. After reheating at 490° F. in an oven for 7 minutes, it was equivalent to a product made by grinding baked potato skins in the manner described in Example No. 1.

The invention also provides a novel potato product made as described above without the baked potato skins being used in the extruded outer layer. For example, a core of mashed potatoes can be encased in an outer layer of potato solids having a higher solids content than that of the core. The composite intermediate product is then fried or baked after shaping. The flavor, texture, and color of the final exterior layer can be adjusted by adding various food ingredients such as egg solids, soy protein derivatives, dextrose, whey solids, onion powder, and other flavorings. Minor quantities of baked potato peel fraction made as described above also can be added to give a background flavor note of baked potatoes if desired.

EXAMPLE NO. 4

A cylindrical potato product about one inch in diameter and two inches long with flat compressed ends and a fried outer shell resembling french fried potatoes was made by extruding an outer layer of potato flake dough around an inner core of potato mash also made from potato flakes. The inner mash was made by combining 100 gm. of standard potato flakes with 395 gm. water at 70° C. This mash, containing 81.2% moisture, was rolled into convenient cylindrical shapes similar to those prepared from fresh baked potato mash in Example No. 1. An external mash layer was prepared from potato flakes ground to pass a 20 mesh sieve to form a cohesive outer layer for these tests. The quantity of water added to the ground flakes was varied to adjust the moisture content of the exterior layer from 57% to 78% as shown in the table below. The dough was extruded around the inner mash portions using the 1.25-inch diameter, 1/16 inch wide laboratory die as in Example No. 1. A portion of each product was fried for 55 seconds at 375° F. and a second portion was baked five minutes at 490° F. to firm the outer surface.

| Sample | Moisture Content % | Potato Flakes (−20) gm. | Water gm. | Observation of Outer Layer |
|---|---|---|---|---|
| A | 57 | 150 | 164 | Good |
| B | 64 | 150 | 225 | Good |
| C | 70 | 150 | 300 | Wet, fair |
| D | 75 | 150 | 390 | Too wet to adhere to mash |
| E | 78 | 150 | 464 | Too wet to adhere to mash |

Samples A and B with 57% and 64% moisture in the exterior layer formed and acceptable skin either fried or baked. The samples with 70% moisture in the exterior layer were borderline, somewhat too wet to form around the inner layer. By substituting a portion of potato flakes in C with a suitable gum, gelatinized starch, or other binding agent, it could provide a practical skin with light texture. When the exterior layer contained only 75% or 78% moisture, it could not be practically extruded and the resulting shell was greasy and discontinuous.

After freezing and reheating, the fried products A, B and C had a golden color and tasted like a french fried potato instead of a baked potato. This product could be served with regular meals or as a hot snack or hors d'oeuvre. The appearance of the baked products was white and unappetizing when warmed in the oven. When a deep fat fryer was used for final preparation, a golden flavorful crust resulted.

EXAMPLE NO. 5

The same mashed potato portions of Example No. 4 formed from reconstituted potato flakes, were made into cylindrical portions, approximately 1 inch in diameter and were dried for a period of 5 to 10 minutes in a forced circulation oven maintained at 250° F. A skin developed through the dehydration of the outer surface, however, the product was still white in appearance. These samples were light fried but after immersion in fat at 340° F., escaping steam blew holes in the dried surfaces, destroying the shape of the product.

EXAMPLE NO. 6

Using the same procedure as Example No. 5, another novel potato product was made from potato flakes which were heated to 250° F. for several hours until they turned from white to light tan. These toasted potato flakes were then ground to pass a 20 mesh screen and mixed with water to provide a dough having a moisture content of about 55%. The dough was extruded around a core of potato mash made from regular untoasted potato flakes and both were baked and fried to produce the finished product. After freezing and reheating, the external layer had a desirable flavor, somewhat resembling a baked potato skin.

IMPROVED PROCESS B

Figure 2:
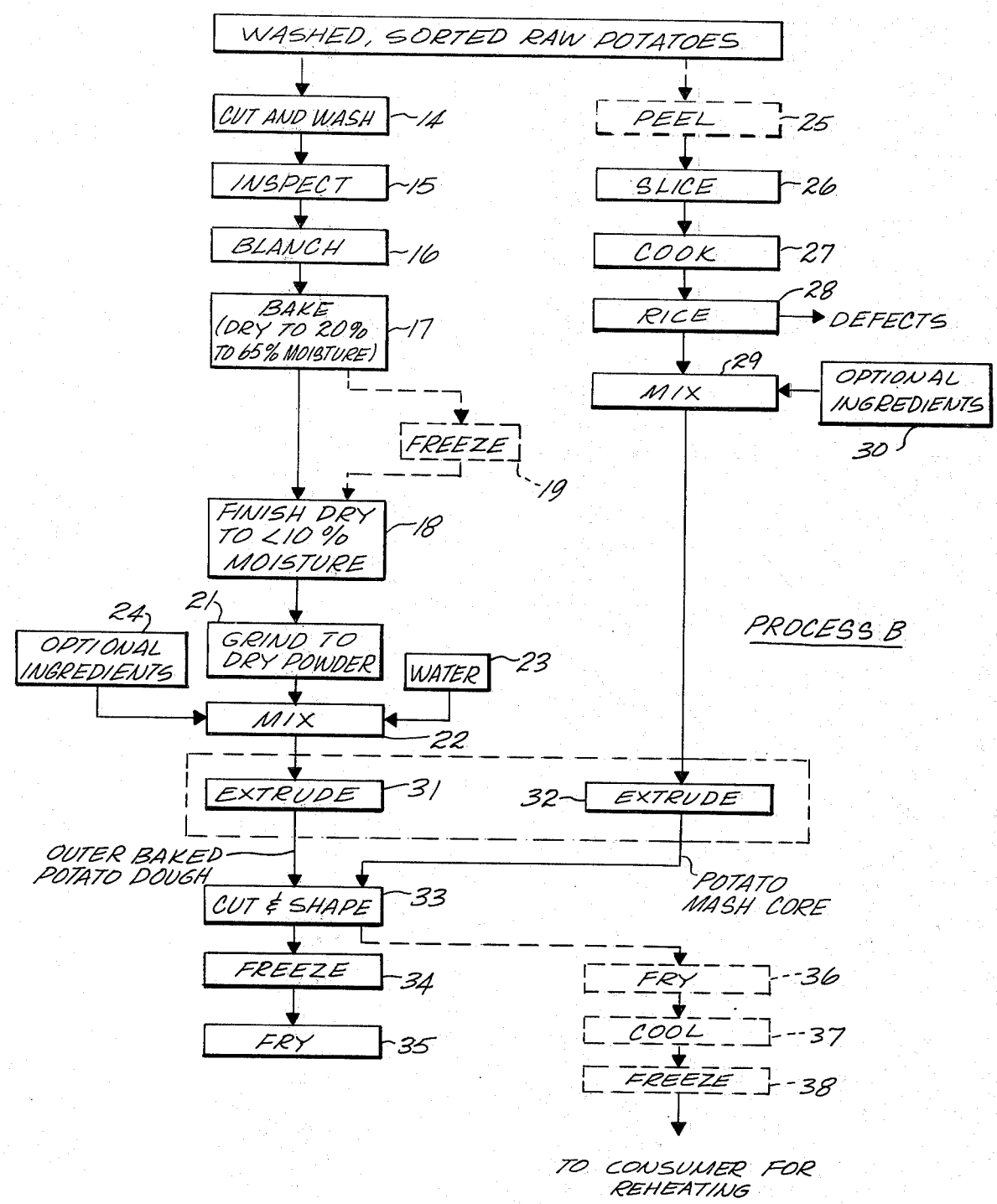
FIG. 2 is a flow diagram of a presently preferred, improved Process B for preparing a fabricated baked potato product.

FIG. 2 illustrates my presently preferred method for making fabricated baked potato products. According to this method, potato pieces having at least a portion of the internal tissue exposed (hereafter called "peeled potato pieces") are baked and comminuted to form fine particulate baked potato solids which are used to formulate a baked potato dough to be formed around a potato mash core. The peeled potato pieces can be produced by cutting initially raw unpeeled or peeled whole potatoes; or the pieces can be peeled or partially peeled whole potatoes or potato sections, as long as the potato pieces have at least a portion of their internal tissue exposed during baking. Assuming that unpeeled or peeled whole potatoes are used as the starting material for Process B, these potatoes are first processed by a cutting and washing step 14 in which the potatoes are washed and cut into pieces substantially smaller in size than a whole potato. The preferred cutting apparatus is a commercial french fry slicer known in the industry as an Urshel slicer. The preferred slice thickness is about ¼- to ½-inch, although good results also are obtained by cutting the potatoes into ½-inch dice, or ⅜-inch strips similar to french fries.

I have discovered that the step of baking peeled potato pieces, as opposed to baking unpeeled potatoes entirely in their skins, produces a number of significant improvements to the process of this invention. The following is a summary of these improvements.

IMPROVEMENTS RESULTING FROM BAKED PEELED POTATO PIECES (1). Potatoes have more surface area exposed to heat during baking which produces appreciably more intensity of baked potato flavor, for a given quantity of potatoes, when compared with Process A.

(2). The rapid removal of water during baking permits the potatoes to be easily processed directly into a stable form.

(3). Difficulties involved in separating peel fraction from internal mesh in Process A are eliminated.

(4). Internal defects are exposed before baking, which simplifies defect removal.

(5). Continuous and difficult regulation of flow of peel fraction and mesh fraction in Process A is avoided, which eliminates production and sanitation problems.

(6). The baked potato ingredient can be made from potatoes which are peeled, which eliminates contamination that may be more appreciable in potato skins when compared with potato insides, e.g., rot, soil organisms, skin diseases and residuals from insecticides and sprout inhibitors.

(7). Low cost by-products from commercial french fry production, such as slivers, nubbins, and small whole potatoes, can be used.

After the potatoes are cut, they are fed onto an inspection table where defects are removed in an inspection step 15. The step of cutting the potatoes into small pieces exposes the insides of the potatoes and makes it possible to remove substantially all internal defects in step 15.

The inspected pieces are then subjected to a blanching step 16 which inactivates enzymes known to cause oxidative deterioration of color and flavor. The blanching step is normally conducted at a temperature over 200° F. in either water or steam for between one to ten minutes, depending upon the size of the potato pieces and the construction of the blanching equipment. The blanching of cut peeled potato pieces prior to baking and drying improves the flavor of the baked potato powder described below.

The potato pieces are then conveyed to an oven for a baking step 17. The potatoes are baked at a sufficiently high temperature and for a long enough period of time to dehydrate the outer portions of the potatoes (i.e., to raise these portions of the potatoes above 100° C.) in order to generate sufficient pyrazine formation to produce the desired baked potato flavor. The preferred baking equipment is a through-circulation dryer of the type used in commercial production of dehydrated diced and sliced potatoes. A continuous conveyor moves the potato pieces through a first stage of the dryer where the potato pieces are baked between about 30 to about 60 minutes at a temperature of between about 250° F. to 400° F. In a finish-drying step 18, the baked pieces are dried in a second stage dryer, or in a separate dryer, for finish-drying the pieces at a temperature of about 140° F. for about two to four hours.

The first stage of the dryer simultaneously bakes the potato pieces and partially dehydrates them to a moisture content of about 20% to about 65% by weight, preferably to a moisture content within the range of about 30% to 50%. The baked potato pieces are finish-dried at a relatively lower temperature (normally about 140° F.) to avoid scorching. Preferably, the baked potato pieces are dehydrated to a moisture content below about 10% by weight, the presently preferred moisture content being about 7%. This produces a stable intermediate product having good baked potato flavor.

Potatoes having a slice thickness between ¼-inch to ½-inch or strips about ⅜-inch thick produce a highly desirable baked potato flavor with minimal scorching when subjected to the baking and finish-drying steps described above.

In an alternate baking step, the peeled potato pieces, following blanching, can be baked in an oven for about one hour at a temperature of between about 375° F. to 400° F. The baked pieces are then removed from the oven and finish-dried to dehydrate the pieces to a stable moisture content of less than about 10%.

An optional freezing step 19 can be used to preserve the baked, partially dried potato pieces. The frozen pieces then can be finish-dried at a later time whenever the need for them arises.

I have discovered that significant improvements result from baking and drying peeled potato pieces in the through-circulation dryer described above. The dryer blows hot air at sufficient velocity through the bed of potato pieces to bake and rapidly dehydrate the pieces sufficiently to produce baked potato flavor in a shorter time than a conventional oven maintained at 375° F. for one hour. The first stage baking and drying step in the forced-air dryer removes about 50% to 75% of the moisture from the potato pieces when the dryer is maintained at a temperature of between about 250° F. to 350° F. for less than about 45 minutes. In addition to the shorter baking time and temperature, I have discovered that baking and drying potato pieces in the forced-air dryer improves the baked potato flavor when compared with baking in a conventional oven. Potatoes baked in an oven at relatively higher temperatures for a longer time tend to produce more internal discoloration, resulting in a tendency to produce off-flavors. Higher temperatures and prolonged baking are avoided in the forced-air dryer, and significantly improved baked potato flavor is produced.

The baked dried potato pieces are cooled and then ground into a powder herein referred to as "baked potato powder". The dehydrated baked potato pieces, following the finish-drying step 18, may be immediately ground; or they may be preserved at room temperature or lower, and, as they are needed, ground into dry powder.

According to the preferred grinding step 21, the baked pieces are comminuted in a hammermill to a particle size that passes a 40 mesh (417 microns) screen. This process can be used to constantly produce fresh baked potato powder used in formulating a baked potato dough. In a mixing step 22, water 23 and optional potato-based binding ingredients 24 are mixed with the baked potato powder. Preferably, the dough is formed by a mixture of baked potato powder, water, and dry cooked potato solids such as ground potato flakes and/or potato granules. Potato starch and other similar binders and thickeners also may be used, if desired. The amount of flakes and/or granules is chosen to blend with the baked potato powder to produce the desired baked potato flavor. The ratio of baked potato powder to dry potato solids controls the level of baked potato flavor desired in the final product. The amount of water added to the mixture controls the cohesiveness of the dough and its ability to be extruded.

The ingredients of the baked potato dough are mixed so that the final dough, at the time of extrusion, has a moisture contact in the range of between about 49% to 64% by weight. The presently preferred moisture content is about 54% to 60%, which produces a dough that can be relatively easily extruded, as well as providing good cohesiveness during frying, good sealed ends on the finished product, and reduced fat pickup during frying.

According to the presently preferred process for making the potato mash core, raw whole potatos are initially peeled in an optional step 25. This step can be omitted if the entire process uses prepeeled potatoes, as described below. The peeled potatos are then sliced by a step 26 and cooked by a step 27 in which the potatos are steamed until cooked throughout. The cooked potatos are then subjected to a ricing step 28 to form a mass of potato mash. The ricer removes any defects in the potato mash.

In a mixing step 29 the potato mash is combined with optional ingredients 30, such as potato solids, milk solids, butter and salt. The ingredients are mixed to produce a mash fraction having a moisture content in the range of about 70% to about 80% by weight, the preferred moisture content being about 76%.

The baked potato dough and potato mash dough are fed to a continuous extruder similar to that described above. The potato mash is extruded through a round die opening in an extrusion step 31, and in a simultaneous extrusion step 32 the baked potato dough is extruded through an annular die opening to form a thin outer layer resembling a skin surrounding the entire outer surface of the extruded mash cylinder. In the presently preferred extrusion step, the potato mash is extruded through a 7/16-inch diameter round die opening, and the baked potato dough is extruded through an annular die opening having a thickness of 0.050 inch and an outside diameter of 0.87 inch.

The extruded cylinder is then subjected to a forming step 33 in which the cylinder is formed into pieces of desired shape. The ends of the pieces are pinched down to seal the ends so as to completely encase the inner mash core in a sealed skin of baked potato dough. Preferably, the extruder forces the cylinder downwardly past a continuous cutting blade located below the extruder die openings. The cut pieces are collected on trays or a conveyor below the cutter.

The formed products are conveyed to a commercial freezing apparatus for a freezing step 34. The frozen products are then packaged for shipment to restaurants, consumers, or the like. The products are prepared for eating by a frying step 35 in which the products are fried for about 2 minutes in hot cooking oil at a temperature of about 360° F. This produces a finished product which captures the flavor of fresh baked potatos, but also has a fried outer skin having a tender, crisp texture, especially when the product contains from about 6% to about 12% fat by weight.

According to an alternate practice of the invention, the products formed by step 33 are fried in fat for about 30 to 90 seconds at a temperature of 350° F. to 380° F. The fried products are cooled in a step 37 by passage of air at room temperature or lower. After the products cool, they are preserved by a freezing step 38 and later packaged for shipment to the consumer. The consumer prepares the frozen products for eating by baking them in an oven preferably at about 375° F. for about 8 to 12 minutes.

The alternate cooking techniques shown in FIG. 2 both produce good commercial products, although the method of freezing the products (step 34) followed by frying (step 35) is preferred over the method of frying (step 36) prior to cooling (step 37), freezing (step 38) and then baking. I have discovered that the process of frying the frozen uncooked product (step 35) produces a crisper outer shell having a better fresh, baked potato flavor which avoids any traces of warmed-over flavors which might be produced when baking the products following the frying, cooling and freezing steps 36, 37 and 38.

I have also discovered that a different type of finished product is produced by cooking techniques comprising (1) adding a small amount of fat to the outer coating during the mixing step 20, (2) baking at about 300° F. for about 12 minutes, (3) freezing, and (4) reheating by baking at about 375° F. to 400° F. until heated throughout. This alternate process produces a finished product in which the fabricated outer skin, following the reheating step, is tougher than the fried products, but the skin more closely resembles the texture and flavor of natural baked potatos.

I have further discovered that the consecutive steps of baking the formed product from step 33, followed by freezing and then frying is not a practical cooking technique. The baking step tends to case-harden the skin, and the rapid escape of steam produced during frying can explode the hardened outer shell and deform the finished products.

IMPROVED PROCESS C

Figure 3:
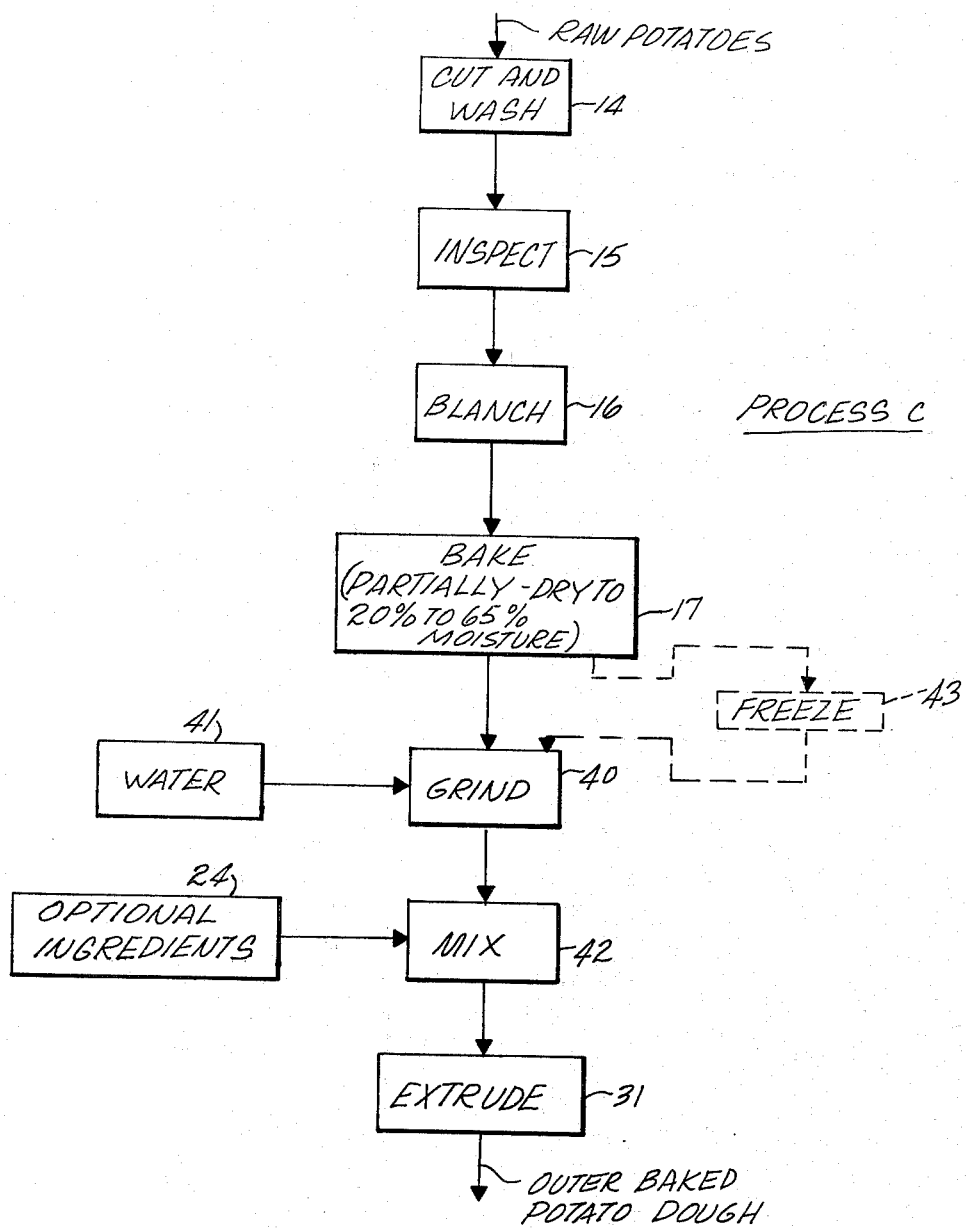
FIG. 3 is a flow diagram of an alternate improved Process C.

FIG. 3 illustrates an alternate method of forming the baked potato dough. According to this method, peeled potato pieces processed according to steps 14, 15 and 16 of Process B are then partially dried to a moisture content between about 20% to 65%. The resulting partially-dried pieces are then processed into the baked potato dough without producing the finish-dried pieces or the baked potato powder of Process B. According to Process C, the peeled potato pieces are preferably baked and partially dried in the through-circulation dryer described above. The partially dehydrated baked pieces are then comminuted by a grinding step 40 in which the pieces are mixed with water 41 and ground to produce a slurry or baked potato particles. Preferably, sufficient water is added to produce a slurry having a moisture content between about 80% to 90% by weight.

The baked potato slurry is then mixed with the optional ingredients 24 in a mixing step 42 to produce the final dough mixture. The partially dehydrated inner portions of the baked potato pieces provide sufficient cooked potato solids to act as a binder which requires that less dry potato solids be added to the dough to produce the final moisture content of about 49% to 64%.

Optionally, the partially dehydrated potato pieces from step 17 can be preserved by a freezing step 43 and then ground with added water 41 prior to the mixing step 42.

In Process C the potato pieces are partially dehydrated, which enables them to be ground and formed into a cohesive dough with less added ingredients being required when compared with Process B. The partially dried inner portions provide a good binder when ground to form a cohesive dough. A slightly greater amount of added dry potato solids are required in Process B to produce a cohesive, extrudable dough having the desired 49% to 64% moisture content. Process C also reduces the amount of water added to the dough and reduces the energy required for eliminating the dehydration step 18 of Process B.

Despite these advantages, Process B is presently preferred. I have discovered that Process B produces significant advantages in terms of efficient commercial production techniques. The baked potato powder is a stable dehydrated ingredient which easily lends itself for use in commercial production techniques. For example, the partially dried potato pieces of Process C generally have an unpredictable solids content. Thus, production techniques for producing a baked potato dough of a specific moisture content, say within the range of 49% to 64%, are more difficult than with a dry baked potato flour which has a known moisture content.

The baked potato dough can be formulated from all dried ingredients mixed in desired proportions with sufficient water to formulate a dough having the desired 49% to 64% moisture content. The dry baked potato powder can be mixed with the amount of potato flakes and/or granules and potato starch, if desired, to give the desired final flavor to the baked potato dough. The baked potato flavor intensity of the baked potato dough is controlled by the intensity of the flavor of the baked potato ingredient, which can vary depending upon the techniques used in the baking process, the composition of the starting potatos, and the size of the baked pieces. I have conducted a number of experimental evaluations to determine the factors which influence the intensity of the baked potato flavor present in the baked potato ingredient. To summarize, baked potato flavor tends to increase with longer baking time and relatively higher baking temperature. Relatively smaller potato pieces produce greater baked potato flavor than relatively larger pieces for a given baking time and temperature. Piece size, baking time and temperature can be controlled so that the outer portions of the potato pieces are sufficiently dehydrated (to temperatures above 100° C.) to generate the pyrazines responsibe for the desired baked potato flavor.

Further, I have discovered that the flavor produced when baking completely peeled potatos is of greater intensity than the flavor produced by baking unpeeled potato pieces. This comparison of flavor intensity is independent of slice thickness or size. As a result of this discovery, the entire potato can be used to produce the baked potato flavor ingredient, which greatly reduces the cost of producing the baked potato dough of Processes B or C when compared with using only the potato skins for the baked potato ingredient as in Process A. Moreover, the baked potato dough of Processes B or C requires only about 6% to 10% baked potato ingredient as compared with about 20% for Process A. Further, peeled potato pieces such as "slivers" and "nubbins" and small whole potatos ("eliminators"), which are ordinarily available as by-products products of commercial potato processing and french fry production, can be used in producing the baked potato ingredient of Processes B and C.

In considering commercial production techniques, the use of peeled potato pieces in Processes B and C provides a substantial improvement over Process A. For example, it is difficult to continuously control the steps of baking whole unpeeled potatos, followed by separating the peels, grinding them, adding water, and mixing them into a dough of controlled solids content. One reason is that raw whole potatos have varied solid contents and dehydrate to various degrees during baking. This makes it difficult to control the final solids content of the baked potato dough in a continuous production line.

In the Process A step of baking raw, whole unpeeled potatos, water loss is present only at the surface of the potato. The water loss from the internal mash is relatively low, say from 80% to about 78%. This poses a substantial problem in separating the peels from the hot mashed potatos to produce separate peel and mash fractions in a commercial production process. In production, there tend to be variable quantities of baked potato peel and mash recovered from such a separation process. Inasmuch as the formulation of these components into a finished product remains constant, the process line requires frequent accurate checks and balances so as to minimize unwanted accumulation or shortage of the various components (ground baked potato skins, separated baked potato mash, or mash from the insides of unbaked cooked potatos). Accumulation of the potato mash component is especially undesirable because mashed potatos are typically contained in surge bins where mold and bacterial problems as well as off-flavor development can occur if substantial amounts of cooked potatoes accumulate for prolonged periods.

Separation of the cooked inner mash from the baked skins also results in specks of potato peel being constantly present in the cooked inner mash. The tendency of such small particles being carried through the openings in a ricer is unavoidable, and attempts to remove them in a separate sieving operation are difficult and time consuming.

The process of baking potatoes in their skins prior to separation also makes it difficult to locate and separate internal defects. In Processes B and C, the precutting of the potatoes into small slices, strips, or dice makes it relatively easy to inspect the potatoes for internal defects, because the small potato pieces are easy to handle, and internal defects are visible.

IMPROVED PROCESS D

FIG. 4 illustrates an alternate Process D which combines the advantages of Processes A and C. Process D also takes advantage of the ability to remove defects when starting with potato pieces having at least a portion of their insides exposed, as compared with whole, unpeeled potatoes. In Process D, raw peeled or unpeeled whole potatoes are cut into pieces and used for preparing the baked potato dough fraction. These potato pieces are inspected for defects at the inspection step 16 where large defects are completely removed from the process. Pieces having minimal defects are separated and transferred to the process for making the potato mash fraction. In a trimming step 26, defects are removed from the raw potatoes peeled in step 25 as well as from the potatoes separated from inspection step 16. These defects are then removed completely from the process. The inspected potatoes are then cooked at step 27, and the cooked mash is then riced at step 28 to remove any remaining defects. Any peels separated by the ricing step 28 are also discarded.

The potato pieces are baked and partially dried in the baking step 17, followed by a ricing step 47 which removes any cooked inner potato mash from the baked, partially dried surfaces. If unpeeled potatoes are used as raw material, the potato peelings are separated together with the case-hardened surfaces of the exposed, cut, baked portions. The baked mash is transferred to the ricer at ricing step 28 to be included in the mashed potato fraction of the process. The baked potato peels and/or surfaces separated from the ricing step 47 are then treated by a soaking step 48 in water 41, followed by grinding and mixing with cooked potato solids 24 to form the baked potato dough.

The following examples illustrate processing techniques used in a pilot production in producing fabricated baked potato products according to this invention.

EXAMPLE No. 7

Step 1: Small Idaho Russet potatoes were scrubbed and cut into ⅜-inch strips, washed to remove starch, and blanched in water at 95° C. for a period of 3 minutes to inactivate enzymes. The blanched strips were baked in a layer approximately 1-inch deep on a stainless tray in an oven maintained at 190° C. The strips were stirred at 15-minute intervals to obtain uniform dehydration and exposure to the heat. After 60 minutes the strips had lost approximately 50% of their original weight, indicating a moisture content of approximately 45%, based on the original moisture content of 77% in the raw potatos. The strips had a typical baked potato odor and were slightly browned on the surfaces where substantial dehydration had occurred.

Step 2: The baked strips were than dried in a dryer maintained at about 50° C. to a final moisture content of less than 10%. The dry baked potato pieces were then ground through a 417 micron, U.S. 40 mesh screen to form the baked potato powder.

Step 3: The baked potato dough was made by adding baked potato powder (1284 grams) to room temperature water (7800 grams) in a stainless bowl and allowed to rehydrate for 15 minutes. A mixture of dry food solids (5512 grams) was prepared containing the following ingredients:

|  | Grams |
|---|---|
| Potato flakes | 2225 |
| Potato granules | 2225 |
| Modified high amylose starch | 393 |
| Hydrolyzed cereal solids | 393 |
| Salt | 272 |
| Sodium acid pyrophosphate | 6.7 |

This mixture was added to the rehydrated baked potato powder and mixed in a 12-quart Hobart mixer operated at 60 rpm for a period of 5 minutes. The resulting baked potato dough had a moisture content of 57%.

Step 4: Standard Idaho Russet process grade potatoes were peeled, trimmed and cut into ½-inch slabs which were cooked in steam at 96° C. until soft. The cooked potatoes were riced through 1/16-inch openings.

Step 5: A quantity of hot riced potatoes (13, 523 grams) was combined in the same mixer with the following ingredients:

|  | Grams |
|---|---|
| Butter | 360 |
| Potato granules | 191 |
| Dry milk | 130 |
| Salt | 26 |
| Monoglyceride emulsifier | 10 |
| Sodium acid phosphate | 3.1 |

These ingredients were added to the mash and mixing was continued for 3 minutes until a uniform potato mash dough was obtained.

Step 6: The baked potato dough and the mash dough were introduced into a Werner/Lehara double roll former fitted with a die designed to give a concentric extrusion of peel dough approximately 0.88 inch outer diameter and 0.050 inch thick surrounding an extrusion of potato mash dough 0.5 inch in diameter. The speed of rotation of the two stainless feeding rotors was adjusted so that the baked potato dough and the potato mash dough were extruded at the same linear velocity at about 60 inches per minute. A rotating twin-lobe cutter positioned directly below the die opening molded and cut the extrusion into 2-inch lengths. At each edge of the individual units, the baked potato dough was pushed together, thereby sealing the potato mash internally in the outer layer of baked potato dough. Each formed intermediate product weighed approximately 14 grams. It was observed that the outer layer varied from 45% to 55% by weight of the total product.

Step 7: The product from Step 6 was deep fat fried in palm oil maintained at 350° F. for 60 seconds. The fried product was golden brown in color and crisp and could be easily drained, cooled and later frozen.

Step 8: The frozen product was placed on a baking tray and reheated in an oven at 400° F. for a period of 10 to 12 minutes. The finished product had a pleasing golden brown exterior, crisp edges and surfaces, and a distinctive flavor. The internal mash was mealy and also flavorful.

EXAMPLE NO. 8

The process of Example No. 7 was repeated through Steps 1 through 6.

Step 1: The formed product was frozen on trays without frying.

Step 2: The frozen product was removed from the freezer and fried in a typical restaurant fryer at 375° F. for about 2 minutes. The interior mash was heated through completely, and the exterior was golden brown and crisper than the product of Example No. 7.

EXAMPLE NO. 9

Step 1: The product from Step 1 of Example No. 8 was removed from the freezer and fried for a period of one minute at 350° F., cooled, and returned to the freezer.

Step 2: The product from Step 1 was removed from the freezer and reheated by oven-baking for a period of 10 minutes at 400° F. The finished product had excellent flavor and texture and retained its shape well as compared with the products from Examples No. 7 and 8.

EXAMPLE NO. 10

Step 1: Baked potato strips from Example No. 7, Step 1, were removed from the oven and instead of being dried, were ground, cooled and frozen in bulk.

Step 2: The baked potato dough was made by grinding the frozen baked potatoes directly from the frozen state in a suitable grinder equipped with 0.015 openings. A quantity of water was added at the time the product was ground to facilitate grinding, which resulted in a baked potato slurry containing about 87% moisture.

Step 3: The baked potato slurry from Step 2 was combined with the same dry solid ingredients in the same ratio of baked potato solids to dry potato solids as used in Example No. 7, Step 3, to produce a baked potato dough of 58% solids.

Step 4: The baked potato dough was extruded in a similar manner to Example No. 7 with substantially similar results.

EXAMPLE NO. 11

Step 1: The frozen baked potato strips from Example No. 10, Step 1, were removed from the freezer, allowed to thaw, and dehydrated at 50° C. for a period of about 5 hours to a moisture content of below 10% and ground to pass a 40 mesh screen. This baked potato powder was used in the same manner as described in Example No. 7 with substantially similar results.

EXAMPLE NO. 12

Baked potato strips prepared in Example No. 7, Step 1, were removed from the oven, mixed with sufficient water to make a slurry having approximately 86% moisture, and ground directly through a 0.015-inch opening. This slurry was combined with dry ingredients as used in Example No. 7 with substantially similar results. In later experiments, I found it advantageous to substitute additional quantities of potato granules in place of potato flakes in the baked potato dry ingredients. Increasing the level of potato granules at the expense of the more fragile potato flakes in the baked potato dough formulation appeared to balance the additional stickiness resulting from grinding the partially dehydrated baked potato strips.

EXAMPLE NO. 13

A series of baking experiments were conducted to compare the effect of baking potatoes cut to various sizes. Idaho Russet potatoes of known solids content were sliced, diced or cut into strips as shown in the table below. Selected samples were water blanched 3 minutes in boiling water to measure this effect. Other samples were peeled to various depths to compare the flavor of the unpeeled samples with those that had been peeled. All samples were baked on a stainless steel perforated tray in a typical household oven maintained at 375° F. for a period of about 60 minutes. The samples were stirred at 15-minute intervals to achieve uniformity of heat treatment.

The baked samples were weighed to determine the weight loss, from which the moisture content was calculated. The samples were then finish-dried to under 10% moisture in a through-circulation laboratory dryer set at 140° F. The samples were ground to pass a 40 mesh sieve and evaluated by a trained taste panel for baked potato flavor.

| Test No. | Size in. | Peel | Blanch | Weight Before Baking gms. | Weight After Baking gms. | Baked Potato Moist. % (a) | Evaluation (b) |
|---|---|---|---|---|---|---|---|
| | Slice | | | | | | |
| 96A | ½ | No | No | 1471 | 833 | 40.1 | 5 (c) |
| 96B1 | ⅛ | No | No | 476 | 129 | 84.0 | 7 |
| 96B2 | ⅛ | No | No | 438 | 109 | 91.0 | 7 |
| | Dice | | | | | | |
| 96C | ½ | No | No | 844 | 409 | 46.8 | 3 |
| 96D | ½ | 3mm | No | 825 | 388 | 48.3 | 3 |
| | Strips | | | | | | |
| 98A | ⅜ | No | No | 1090 | 354 | 69.9 | 5 |
| 98B | ⅜ | No | No | 1058 | 326 | 73.7 | 5 |
| 98C | ⅜ | No | No | 1082 | 371 | 66.2 | 5 |
| 118A | ⅜ | No | No | 808 | 314 | 54.5 | 5 |
| 118B | ⅜ | No | Yes | 850 | 280 | 64.3 | 5 (d) |
| 118C | ⅜ | Min. | No | 972 | 394 | 52.3 | 5 |
| 118D | ⅜ | Min. | Yes | 894 | 354 | 58.9 | 5 (d) |
| 118E | ⅜ | 1mm | No | 699 | 298 | 47.9 | 5 |
| 118F | ⅜ | 5mm | No | 558 | 209 | 56.7 | 5 |

(a) Calculated from specific gravity measurements of raw potatoes and weight loss during baking. Solid content of raw potatoes used in tests 96 and 98 was 22.7%; in test 118, 21.2%.
(b) Baked potato intensity was evaluated using the following scale:
 1. No baked potato flavor noted by any taster.
 2. Threshold..barely noticeable by most tasters.
 3. Weak baked potato flavor, not sufficient for commercial use.
 4. Less than standard, still desirable.
 5. Standard baked potato, desirable.
 6. More than standard, too noticeable.
 7. Extreme..scorched.
(c) This sample not dried.
(d) Flavor better quality than others, same intensity.

EXAMPLE NO. 14

A series of baking tests were conducted using an experimental through-circulation tray dryer manufactured by Proctor & Schwartz. Electrically heated air at various temperatures and a velocity of 330 ft/min. was used to simultaneously bake and dehydrate unpeeled potatoes of three varieties that had been cut in ⅜ inch strips, blanched in hot water 3 minutes, drained and weighed into the 2-square foot drying tray. By weighing the tray during the tests the overall weight loss of the potatoes was controlled to between 60% and 70% during drying. The moisture content of the dried baked pieces varied from 23% to 49%. All products were finish-dried in the same tray at 140° F. for a period of 2 to 3 hours to a final moisture content below 10%.

Concurrently, a control sample of the same variety of potatoes was baked as described in Example No. 7, Step 1, in the same laboratory oven at 350° F. In each case, a period of 90 minutes was required to reach a 60% reduction in weight. These control samples were also finish-dried at 140° F. for 2½ to 3 hours.

| Test No. | Lbs Per Sq. Ft. | Temp °F. | Air Direction | Time Min. | Wt. Loss % | Baked Potato Moist. % | Evaluation (a) |
|---|---|---|---|---|---|---|---|
| Old Russet Potatoes, From 10 Months storage, containing 23% solids: | | | | | | | |
| Control | 2.0 | 350 | None | 90 | 45 | 45 | (b)no grade |
| B-3 | 4.7 | 350 | Down | 30 | 70 | 23 | 5 |
| B-4 | 5.0 | 300 | Down | 43 | 64 | 36 | 5 |
| B-5 | 5.6 | 275 | Down | 50 | 66 | 31 | 5 |
| B-7 | 5.0 | 275 | Up | 40 | 70 | 23 | 5 |
| New Russet Potatoes, recently harvested, containing 18.8% solids: | | | | | | | |
| Control | 2.0 | 350 | None | 90 | 60 | 53 | 4 (c) |
| B-6 | 5.9 | 275 | Up | 40 | 64 | 49 | 4 |
| New Kennebec Potatoes, recently harvested, containing 19.6% solids: | | | | | | | |
| Control | 2.0 | 350 | None | 90 | 60 | 51 | 4 (c) |
| B-2 | 3.3 | 350 | Down | 30 | 70 | 35 | 4 |

(a) See Example No. 13 for rating scale.
(b) Sample had disagreeable internal discoloration and untypical baked flavor.
(c) Each sample had slight internal discoloration and less agreeable baked flavor than corresponding sample baked in the through-circulation tray dryer.

I claim:

1. A process for preparing a fabricated potato product containing baked potato solids, comprising the steps of:
  (a) baking pieces of potato tissue with the potato insides exposed to air during baking;
  (b) comminuting the baked pieces;
  (c) forming an essentially potato-based dough from the comminuted baked potato pieces;
  (d) preparing cooked potato mash; and
  (e) forming an outer layer of the dough around a core of the cooked potato mash to form an intermediate fabricated potato product in which the core is sealed inside the outer layer of dough.

2. The process according to claim 1 including cutting whole potatoes into pieces of potato tissue substantially smaller than a whole potato, and thereafter baking the cut pieces.

3. The process according to claim 1 including the steps of peeling whole potatoes, followed by cutting the peeled potatoes into pieces of potato tissue substantially smaller than the whole potato, and exposing the surfaces of the cut peeled potato pieces to heated air during the baking step.

4. The process according to claim 1 including frying the intermediate product in hot cooking oil to form a finished fried product having a baked potato flavor.

5. The process according to claim 4 including freezing the finished product after frying, followed by heating the frozen fried product.

6. The process according to claim 1 in which the dough of the intermediate product has a moisture content of between about 49% and about 64% by weight.

7. The process according to claim 6 in which the dough consists essentially of the comminuted baked potato pieces, water, and extraneously added solids selected from the group consisting of dehydrated potato solids, cooked potato solids, and starch.

8. A process for preparing a fabricated potato product containing baked potato solids, comprising the steps of:
  (a) baking pieces of potato tissue with the potato insides exposed to air during baking, the potato pieces being dehydrated during baking sufficiently to reduce their moisture content to less than about 10% by weight;
  (b) comminuting the baked dehydrated pieces to form a baked potato powder;
  (c) forming an essentially potato-based dough from the baked potato powder;
  (d) preparing a mass of cooked potato mash; and
  (e) forming an outer layer of the dough around a core of the cooked potato mash to form an intermediate fabricated potato product in which the core is sealed inside the outer layer of dough.

9. The process according to claim 8 including frying the intermediate product in hot cooking oil to form a finished fried potato product having a baked potato flavor.

10. The process according to claim 8 including cutting whole potatoes into pieces of potato tissue substantially smaller than a whole potato, and thereafter baking the cut pieces.

11. The process according to claim 8 including the steps of peeling whole potatoes, followed by cutting the peeled potatoes into pieces of potato tissue sufficiently smaller than the whole potato, and exposing the surfaces of the cut potato pieces to heated air during the baking step.

12. The process according to claim 8 in which the dough of the intermediate product has a moisture content of between about 49% and about 64% by weight.

13. The process according to claim 8 in which the baking step comprises baking the potato pieces at a first temperature above 100° C. to partially dehydrate the potato pieces to between about 20% and about 65% moisture by weight, followed by finish-drying the partially dehydrated potato pieces at a second lower temperature to less than about 10% moisture by weight.

14. A process for preparing a fabricated potato product containing baked potato solids, comprising the steps of:
  (a) heating potato solids in air above 100° C. for a sufficient period of time and with the potato inside portions exposed to the air during heating to form baked potato solids having a moisture content of less than about 10% by weight;
  (b) forming a potato-based dough consisting essentially of the baked potato solids, water, and extraneously added solids selected from the group consisting of cooked potato solids, dehydrated potato solids, and starch, the dough having a moisture content of between about 54% and about 60% by weight;
  (c) preparing cooked potato mash; and
  (d) forming an outer layer of the dough around a core of the cooked potato mash to form an intermediate fabricated potato product in which the core is sealed inside the outer layer of dough.

15. The process according to claim 14 including frying the intermediate product in hot cooking oil to form a finished fried product having a baked potato flavor.

16. The process according to claim 14 in which the dough contains about 6% to about 20% baked potato solids based on the total weight of dry solids in the dough.

* * * * *